United States Patent
Zhao et al.

(10) Patent No.: US 10,897,714 B2
(45) Date of Patent: Jan. 19, 2021

(54) WIRELESS SCENE IDENTIFICATION APPARATUS AND METHOD, AND WIRELESS COMMUNICATION DEVICE AND SYSTEM

(71) Applicant: Sony Corporation, Tokyo (JP)

(72) Inventors: Youping Zhao, Beijing (CN); Jingyun Wang, Beijing (CN); Chen Sun, Beijing (CN); Xin Guo, Beijing (CN)

(73) Assignee: SONY CORPORATION, Tokyo (JP)

( * ) Notice: Subject to any disclaimer, the term of this patent is extended or adjusted under 35 U.S.C. 154(b) by 39 days.

(21) Appl. No.: 16/313,475

(22) PCT Filed: Jul. 12, 2017

(86) PCT No.: PCT/CN2017/092630
§ 371 (c)(1),
(2) Date: Dec. 27, 2018

(87) PCT Pub. No.: WO2018/028376
PCT Pub. Date: Feb. 15, 2018

(65) Prior Publication Data
US 2019/0166505 A1   May 30, 2019

(30) Foreign Application Priority Data
Aug. 12, 2016  (CN) .......................... 2016 1 0663615

(51) Int. Cl.
*H04W 16/14* (2009.01)
*H04B 17/391* (2015.01)
(Continued)

(52) U.S. Cl.
CPC .......... *H04W 16/14* (2013.01); *H04B 17/391* (2015.01); *H04W 16/18* (2013.01); *H04B 17/309* (2015.01)

(58) Field of Classification Search
CPC ..... H04W 16/00; H04W 16/14; H04W 16/18; H04B 17/39; H04B 17/309; H04B 17/391
(Continued)

(56) References Cited

U.S. PATENT DOCUMENTS

2008/0208072 A1* 8/2008 Fadem ................. A61B 5/0484
600/544
2008/0293353 A1* 11/2008 Mody .................... H04K 3/226
455/1
(Continued)

FOREIGN PATENT DOCUMENTS

| CN | 104105106 A | 10/2014 |
| CN | 105430664 A | 3/2016 |
| WO | 2005/076646 A1 | 8/2005 |

OTHER PUBLICATIONS

Maccartney, G.R. et al., "Millimeter-Wave Omnidirectional Path Loss Data for Small Cell 5G Channel Modeling", IEEE Access, vol. 3, Sep. 18, 2015, pp. 1573-1580.
(Continued)

*Primary Examiner* — Rownak Islam
(74) *Attorney, Agent, or Firm* — Xsensus, LLP

(57) ABSTRACT

Provided in the present disclosure are a wireless scene identification apparatus and method for performing identification on the scene category of a predetermined wireless scene, and a wireless communication device and system. The wireless scene identification apparatus comprises: a processing circuit, configured to classify, on the basis of features extracted from environment parameters in a predetermined wireless scene, wireless channel conditions of wireless signals in the predetermined wireless scene by means of a plurality of trained classifiers, and perform decision fusion on the classification results of the plurality of classifiers, so as to classify the wireless channel conditions
(Continued)

as wireless channel conditions in the predetermined plurality of wireless channel conditions.

17 Claims, 12 Drawing Sheets

(51) Int. Cl.
*H04W 16/18* (2009.01)
*H04B 17/309* (2015.01)

(58) Field of Classification Search
USPC .......................................................... 370/329
See application file for complete search history.

(56) References Cited

U.S. PATENT DOCUMENTS

2015/0230263 A1* 8/2015 Roy ..................... H04W 16/28
455/452.2
2018/0365975 A1* 12/2018 Xu ....................... G08B 13/181

OTHER PUBLICATIONS

International Search Report dated Sep. 27, 2017 for PCT/CN2017/092630 filed on Jul. 12, 2017, 8 pages including English translation.

* cited by examiner

| Scene ID | Feature |
|---|---|
| 1 | S1 && I1 |
| 2 | S1 && I2 |
| 3 | S1 && I3 |
| 4 | S1 && I4 |
| 5 | S1 && I5 |
| 6 | S1 && I6 |
| 7 | S2 && I1 |
| 8 | S2 && I2 |
| 9 | S2 && I3 |
| 10 | S2 && I4 |
| 11 | S2 && I5 |
| 12 | S2 && I6 |
| 13 | S3 && I1 |
| 14 | S3 && I2 |
| 15 | S3 && I3 |
| 16 | S3 && I4 |
| 17 | S3 && I5 |
| 18 | S3 && I6 |
| 19 | S1 |
| 20 | S2 |
| 21 | S3 |
| ... | ... |

| | |
|---|---|
| S1 | Desired signal –LOS |
| S2 | Desired signal –NLOS |
| S3 | Desired signal –OLOS |

| | |
|---|---|
| I1 | Interference signal –LOS & intra-cell interference |
| I2 | Interference signal –LOS & inter-cell interference |
| I3 | Interference signal –NLOS & intra-cell interference |
| I4 | Interference signal –NLOS & inter-cell interference |
| I5 | Interference signal –OLOS & intra-cell interference |
| I6 | Interference signal –OLOS & inter-cell interference |

Figure 9

WIRELESS SCENE IDENTIFICATION APPARATUS AND METHOD, AND WIRELESS COMMUNICATION DEVICE AND SYSTEM

CROSS-REFERENCE TO RELATED APPLICATIONS

The present application is a National Stage Application based on PCT/CN2017/092630, filed on Jul. 12, 2017, and claims the priority to Chinese Patent Application No. 201610663615.1, titled "WIRELESS SCENE IDENTIFICATION APPARATUS AND METHOD, AND WIRELESS COMMUNICATION DEVICE AND SYSTEM", filed on Aug. 12, 2016 with the Chinese Patent Office, which is incorporated herein by reference in its entirety.

FIELD

The present disclosure relates to the field of wireless communication, and in particular to a wireless scene identification apparatus and method, and a wireless communication device for identifying a category of a wireless scene.

BACKGROUND

As wireless communication demands increasingly grow, the communication system also has an increasing demand for wireless spectrum resources, causing the spectrum resources for wireless communication have become increasingly scarce. Therefore, the use of cognitive radio (CR) technology is proposed in the conventional technology to make full use of idle spectrum resources temporally and spatially, so as to effectively solve the above difficulty. In the field of cognitive radio, cognition of a wireless environment needs to be intelligent to facilitate the cognition of a complex wireless scene, such that different channel models and wireless spectrum resource allocation strategies are used based on the cognized wireless scene.

On this basis, the present disclosure provides a wireless scene identification apparatus and method based on machine learning.

SUMMARY

An overview of the present disclosure is given hereinafter, to provide basic understanding regarding some aspects of the present disclosure. However, it should be understood that the overview is not an exhaustive overview of the present disclosure, and is not intended to identify a critical part or an important part of the present disclosure, or to limit the scope of the present disclosure. The overview is only intended to give some concepts of the present disclosure in a simplified way, as a preface of detailed description given later.

In view of the above state of the conventional technology, one of the objects of the present disclosure is to provide a wireless scene identification apparatus and method and a wireless communication device based on machine learning for identifying a scene category of a predetermined wireless scene, so as to improve at least the state of the conventional technology.

According to an embodiment of the present disclosure, a wireless scene identification apparatus for identifying a scene category of a predetermined wireless scene is provided. The wireless scene identification apparatus includes a processing circuit configured to classify, by multiple trained classifiers, a wireless channel condition of a wireless signal in the predetermined wireless scene based on a feature extracted from an environmental parameter of the predetermined wireless scene; perform decision fusion on classification results of the multiple classifiers, to classify the wireless channel condition as one of multiple predetermined wireless channel conditions; and identify the scene category of the predetermined wireless scene based on a classification of the wireless channel condition.

According to another embodiment of the present disclosure, a wireless communication device for identifying a scene category of a predetermined wireless scene is provided. The wireless communication device includes a communication device configured to acquire an environmental parameter information from the predetermined wireless scene; and a processing circuit configured to classify, by multiple trained classifiers, a wireless channel condition of a wireless signal in the predetermined wireless scene based on a feature extracted from the environmental parameter information, perform decision fusion on classification results of the multiple classifiers, to classify the wireless channel condition as one of multiple predetermined wireless channel conditions, and identify the scene category of the predetermined wireless scene based on the wireless channel condition.

According to another embodiment of the present disclosure, a method for identifying a scene category of a predetermined wireless scene is provided, which includes classifying, by multiple trained classifiers, a wireless channel condition of a wireless signal in the predetermined wireless scene based on a feature extracted from an environmental parameter of the predetermined wireless scene, performing decision fusion on classification results of the multiple classifiers, to classify the wireless channel condition as one of multiple predetermined wireless channel conditions, and identifying the scene category of the predetermined wireless scene based on the wireless channel condition.

According to the present disclosure, a wireless communication system for identifying a predetermined wireless scene in which the wireless communication system is located is further provided. The wireless communication system includes a predetermined mobile terminal, a serving base station, a spectrum coordinator, and a neighboring base station. The predetermined mobile terminal is configured to receive a desired signal transmitted by the serving base station, and transmit information on a received power and a beam arrival angle for the desired signal to the serving base station. The serving base station is configured to determine an interference type of an interference signal to the desired signal based on the information received from the predetermined mobile terminal, obtain interference information of the interference signal based on the interference type of the interference signal, where a wireless channel condition of the interference signal is obtained as the interference information in a case that the interference type of the interference signal is intra-cell interference, and determine a scene category of the predetermined wireless scene based on the interference information of the interference signal and/or the wireless channel condition of the desired signal. The spectrum coordinator is configured to determine a source of the interference signal, and transmit a request for information on the wireless channel condition of the interference signal to the neighboring base station generating the interference signal in a case that the interference type of the interference signal is determined by the serving base station as inter-cell interference. The neighboring base station configured to, in response to the request of the spectrum coordinator, determine the wireless channel condition of the interference signal by multiple trained classifiers classifying the wireless channel condition of the interference signal based on a feature extracted from an environmental parameter of the predetermined wireless scene, and transmit the wireless channel condition of the interference signal to the spectrum coordinator as the interference information, wherein the spectrum coordinator transmits the wireless channel condition of the interference signal to the serving base station. The serving base station determines the wireless channel condition of the desired signal by: classifying, by multiple trained classifiers, the wireless channel condition of the desired signal in the predetermined wireless scene based on a feature extracted from an environmental parameter of the predetermined wireless scene, and performing decision fusion on classification results of the multiple classifiers. The serving base station determines the wireless channel condition of the interference signal in a case of intra-cell interference and the neighboring base station determines the wireless channel condition of the interference signal in a case of inter-cell interference by: classifying, by multiple trained classifiers, the wireless channel condition of the interference signal based on a feature extracted from an environmental parameter of the predetermined wireless scene, and performing decision fusion on classification results of the multiple classifiers.

In addition, a computer program for implementing the above wireless scene identification method is further provided according to an embodiment of the present disclosure.

In addition, a computer readable storage medium is further provided according to an embodiment of the present disclosure. Computer program codes for implementing the above wireless scene identification method are stored on the computer readable storage medium.

The above wireless scene identification apparatus and method, and the wireless communication device and system according to the embodiments of the present disclosure can at least achieve one of the following beneficial effects: effective improvement accuracy and efficiency for identifying a wireless scene.

These and other advantages of the present disclosure will be more apparent by illustrating in detail a preferred embodiment of the present invention in conjunction with accompanying drawings below.

BRIEF DESCRIPTION OF THE DRAWINGS

The present disclosure may be better understood by referring to the following description given in conjunction with the accompanying drawings in which same or similar reference numerals are used throughout the accompanying drawings to refer to the same or like parts. The accompanying drawings, together with the following detailed description, are included in this specification and form a part of this specification, and are used to further illustrate preferred embodiments of the present disclosure and to explain the principles and advantages of the present disclosure. In the drawings:

FIG. 9 illustrates an example of a wireless scene list including multiple wireless scenes;

Figure 1:
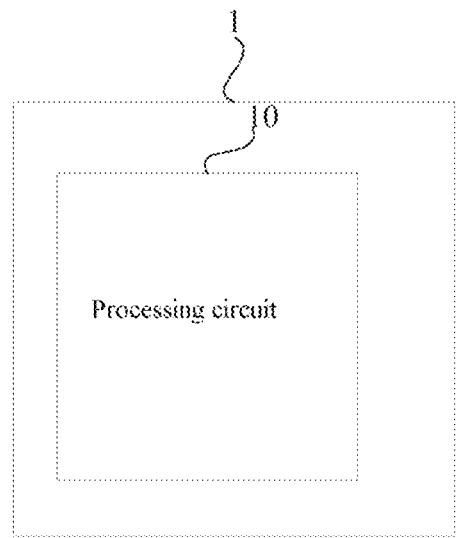
FIG. 1 is a schematic diagram illustrating a wireless scene identification apparatus according to an embodiment of the present disclosure.

It should be understood by those skilled in the art that elements in the figures are shown merely for simplicity and clarity, but not necessarily drawn to scale. For example, the dimensions of some of the elements in the figures may be amplified relative to other elements to help to improve understanding of embodiments of the present disclosure.

DETAILED DESCRIPTION OF EMBODIMENTS

Exemplary embodiments of the present disclosure will be described below in conjunction with the accompanying drawings. For the sake of clarity and conciseness, not all the features of practical implementations are described in the specification. However, it should be understood that, during a process of developing any such practical embodiment, many decisions specific to the embodiment need to be made, so as to achieve specific targets of the developer. For example, limitation conditions relevant to a system and a service should be met, and the limitation conditions may vary with different embodiments. In addition, it should be known that although the developing work may be very complicated and time-consuming, the developing work is only a routine task for those skilled in the art benefiting from the content of the present disclosure.

Here, it should also be noted that in order to avoid obscuring the present disclosure due to unnecessary details, only a device structure and/or processing steps closely related to the solution according to the present disclosure are illustrated in the drawings, and other details having little relationship to the present disclosure are omitted.

The present disclosure provides a machine learning based wireless scene identification apparatus for identifying a scene category of a predetermined wireless scene.

FIG. 1 is a schematic diagram illustrating a wireless scene identification apparatus for identifying a scene category of a predetermined wireless scene according to an embodiment of the present disclosure. As shown in FIG. 1, the wireless scene identification apparatus 1 includes a processing circuit 10. The processing circuit 10 is configured to classify, through multiple trained classifiers, a wireless channel condition of a wireless signal in the predetermined wireless scene based on a feature extracted from an environmental parameter of the predetermined wireless scene, perform decision fusion on classification results of the multiple classifiers, to classify the wireless channel condition as one of multiple predetermined wireless channel conditions, and identify the scene category of the predetermined wireless scene based on the wireless channel condition.

According to an embodiment of the present disclosure, the multiple predetermined wireless channel conditions include M wireless channel conditions, and the multiple classifiers include N classifiers, wherein M is an integer greater than or equal to 2, and N is the number of combinations obtained by combining every two of the M wireless channel conditions, and wherein each of the N classifiers corresponds to one of the combinations, and is configured to classify the wireless channel condition of the wireless signal as one wireless channel condition in the one combination.

The wireless scene identification apparatus according to the present disclosure will be described in detail by taking a case where a wireless channel condition of a wireless signal in the predetermined wireless scene is classified through N classifiers and the wireless channel condition is classified as one of the M predetermined wireless channel conditions as an example.

Figure 2:
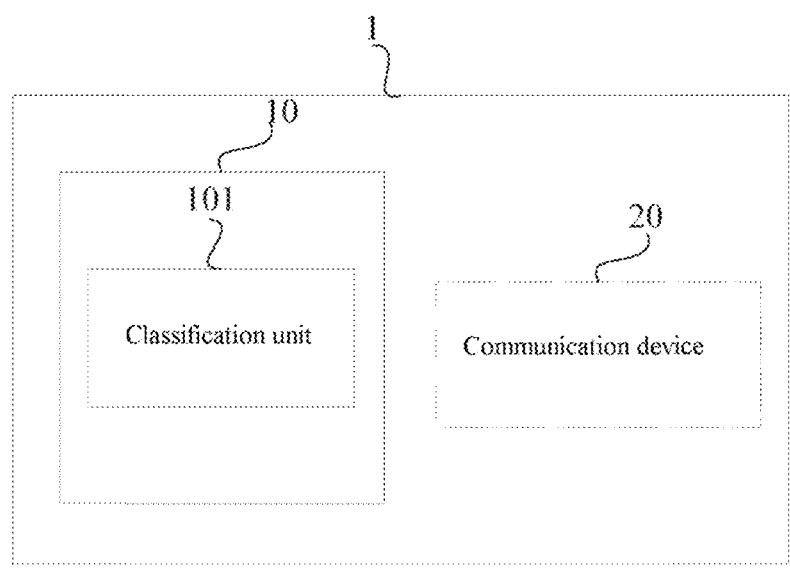
FIG. 2 is a block diagram illustrating an exemplary structure of a processing circuit 10 according to an embodiment of the present disclosure.

FIG. 2 illustrates exemplary functional modules of the processing circuit 10. As shown in FIG. 2, the processing circuit 10 includes a classification unit 101. It should be understood that the functional module may be implemented by one processing circuit or by multiple processing circuits in combination with each other, or may be implemented as a part of a processing circuit. Alternatively, each of the functional modules may be implemented by multiple processing circuits. In other words, implementation of functional modules is not limited. The processing circuit 10 may be, for example, a central processing unit (CPU), a microprocessor, an integrated circuit module or the like which has data processing capability.

According to the preferred embodiment of the present disclosure, the predetermined multiple wireless channel conditions may be classified into three categories, including line of sight (LOS), non line of sight (NLOS) and obstructed line of sight (OLOS). Line of sight (LOS) refers to a wireless channel condition that a propagated signal is not obstructed. Non line of sight (NLOS) refers to a wireless channel condition that a propagated signal is blocked by an impenetrable object. Obstructed line of sight (OLOS) refers to a wireless channel condition that a propagated signal is blocked by a penetrable object. In the present disclosure, being penetrable means that transmitted signal energy can penetrate an obstacle and arrive at a receiving end, but attenuate to a certain extent, and the penetrable object may be, for example, trees, etc; being impenetrable means that the transmitted signal energy cannot penetrate an obstacle and arrive at a receiving end, and the impenetrable object may be, for example, buildings such as a wall. The obstructed line of sight is a category of wireless channel condition between the line of sight and the non line of sight.

According to an embodiment of the present disclosure, a wireless signal in the predetermined wireless scene may be, for example, a desired signal transmitted from a base station to a predetermined mobile terminal. In this case, the processing circuit 10 may be configured to classify, through the multiple trained classifiers such as N classifiers, a wireless channel condition of the desired signal in the predetermined wireless scene based on a feature of the desired signal extracted from an environmental parameter of the predetermined wireless scene, and identify the scene category of the predetermined wireless scene based on the classification of the wireless channel condition of the desired signal.

According to another embodiment of the present disclosure, the wireless signal in the predetermined wireless scene may also be, for example, an interference signal to the desired signal. In this case, the processing circuit 10 may be configured to classify, through the multiple trained classifiers such as N classifiers, a wireless channel condition of the interference signal in the predetermined wireless scene based on a feature of the interference signal extracted from an environmental parameter of the predetermined wireless scene, and identify the scene category of the predetermined wireless scene based on the classification of the wireless channel condition of the interference signal. In addition, according to an embodiment of the present disclosure, the processing circuit 10 may be further configured to identify the scene category of the predetermined wireless scene based on the wireless channel condition of the interference signal and the interference type of the interference signal.

According to yet another embodiment of the present disclosure, the processing circuit 10 may be further configured to classify, through the multiple trained classifiers such as N classifiers, wireless channel conditions of a desired signal and an interference signal in the predetermined wireless scene based on a feature of the desired signal and a feature of the interference signal which are extracted from an environmental parameter of the predetermined wireless scene, and identify the scene category of the predetermined wireless scene based on the classifications of the wireless channel conditions of the desired signal and the interference signal.

As shown by the dashed box in FIG. 2, the wireless scene identification apparatus 1 may further include a communication device 20 for receiving an environmental parameter from at least one of wireless communication devices such as a mobile terminal, a base station and a spectrum coordinator included in the wireless scene. The processing circuit 10 can thus extract feature information from the received environmental parameter, and utilize the feature information to classify the wireless channel condition of the wireless signal in the predetermined wireless scene. The environmental parameter may include, for example, a transmission power at which the base station transmits the desired signal, a received power at which the mobile terminal receives the desired signal, a transmission power and a received power of the interference signal, position information of the mobile terminal and so on.

Figure 3:
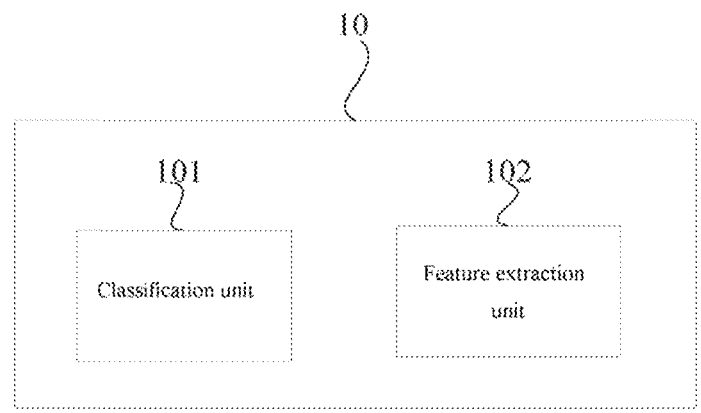
FIG. 3 is a block diagram illustrating an exemplary structure of a processing circuit 10 according to an embodiment of the present disclosure.

FIG. 3 is a block diagram illustrating another exemplary structure of a processing circuit 10 according to an embodiment of the present disclosure. As shown in FIG. 3, in addition to the classification unit 101, the processing circuit 10 may further includes a feature extraction unit 102 for extracting a feature from an environmental parameter acquired from at least one of wireless communication devices such as a predetermined mobile terminal, another mobile terminal (including another mobile terminal in the cell per se and a mobile terminal in a neighboring cell, as the case may be), a base station (including a neighboring base station, as the case may be), and a spectrum coordinator which are included in the wireless scene. The feature includes a feature for determining the interference type of the interference signal and a feature for judging the classification of the wireless channel condition of the desired signal or the interference signal.

The feature for judging the classification of the wireless channel condition of the desired signal or the interference signal includes at least one of path loss of the desired signal or the interference signal, and a variance of the path loss. For example, the variance of the path loss may be calculated based on the path loss of the desired signal or the interference signal in the propagation channel, for determining the classification of the wireless channel condition of the desired signal or the interference signal.

According to the present disclosure, the feature for determining the interference type of the interference signal may include, for example, at least one of the position information of the mobile terminal and an arrival angle of a beam transmitted from a base station. Such information may, for example, be directly acquired through information interaction between wireless communication devices in the predetermined wireless scene. For example, the arrival angle of the beam transmitted from the base station may be acquired through communication between the base station and the mobile terminal, so that the wireless scene identification apparatus 1 can acquire position information of the mobile terminal and the arrival angle of the beam transmitted from the base station from each mobile terminal (including the predetermined mobile terminal) through a communication unit 20.

According to a preferred embodiment of the present disclosure, the feature for judging the classification of the wireless channel condition of the desired signal or the interference signal may also include, for example, a mean value of the path loss of the desired signal or the interference signal (which can also be calculated based on the path loss of the propagation channel), root mean square delay spread and/or kurtosis and asymmetry of a probability distribution function of a received signal.

As described above, the category of the predetermined wireless scene is identified based on the wireless channel condition of the desired signal and/or the interference signal. However, the present disclosure is not limited thereto. The processing circuit 10 according to the present disclosure may be further configured to determine the interference type of the interference signal based on information interaction between wireless communication devices in the predetermined wireless scene, and identify the scene category of the predetermined wireless scene based on classifications of wireless channel conditions of the desired signal and the interference signal, as well as the interference type of the interference signal.

Figure 4:
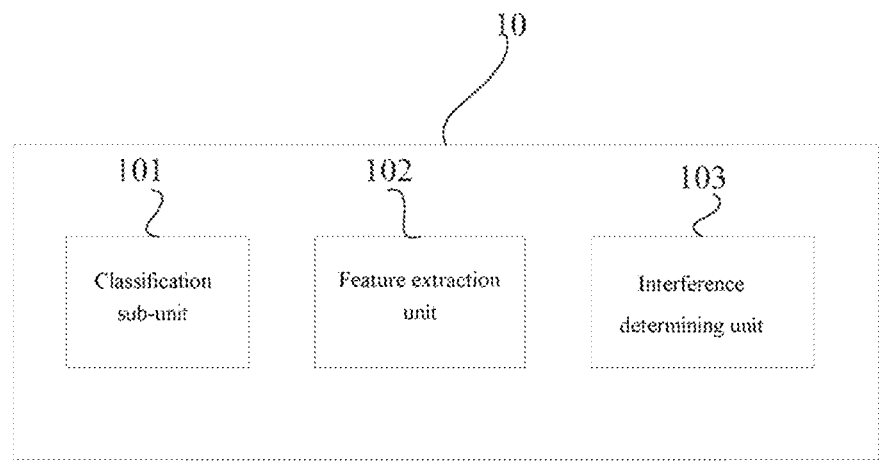
FIG. 4 is a block diagram illustrating another exemplary structure of a processing circuit 10 according to an embodiment of the present disclosure.

FIG. 4 is a block diagram illustrating another exemplary structure of a processing circuit 10 according to an embodiment of the present disclosure. As shown in FIG. 4, in addition to the classification unit 101 and the feature extraction unit 102, the processing circuit 10 further includes an interference determining unit 103 for determining the interference type of the interference signal based on interaction between wireless communication devices in the predetermined wireless scene.

In particular, the interference determining unit 103 can acquire the received power and the beam arrival angle of the mobile terminal for the desired signal, and the position information of the mobile terminal from the mobile terminal based on information interaction (e.g., by transmitting the desired signal from the base station to the mobile terminal) between wireless communication devices, so that the interference determining unit 103 can determine, for example, an interference value (e.g., an interference-to-noise ratio INR) on this basis, and compare the determined interference-to-noise ratio with an interference threshold of the user terminal (e.g., an interference-to-noise ratio threshold INRa), so as to determine whether the desired signal includes an interference signal.

If the determined interference value is less than the interference threshold, the interference determining unit 103 may determine that the desired signal does not include an interference signal (i.e., the interference type is no interference). In this case, the processing circuit 10 may identify the category of the predetermined wireless scene based on classification of the wireless channel condition of the desired signal by the classification unit 101.

If the determined interference value is greater than or equal to the interference threshold, the interference determining unit 103 may determine that the desired signal includes an interference signal. In this case, the interference determining unit 103 may further determine whether the interference signal comes from intra-cell interference or inter-cell interference. In the present disclosure, intra-cell interference is interference to the desired signal caused by a signal transmitted by the serving base station to other mobile terminals served by the serving base station (i.e., the interference signal and the desired signal are transmitted from the same base station), and inter-cell interference is interference to the desired signal caused by a signal transmitted from a neighboring base station to a mobile terminal served by the neighboring base station, that is, the interference signal and the desired signal are transmitted from different neighboring base stations.

It is to be noted that, although whether the interference signal is included is determined by determining the interference-to-noise ratio of the desired signal and comparing the interference-to-noise ratio with the interference-to-noise ratio threshold, the present disclosure is not limited thereto. For example, whether the interference is included may be determined by determining the signal-to-interference-and-noise ratio (SINR) of the desired signal and comparing the signal-to-interference-and-noise ratio to a signal-to-interference-and-noise ratio threshold (SINR$_{th}$), and a source of the interference may be determined as described later.

According to an embodiment of the present disclosure, in a case that the interference determining unit 103 determines that the desired signal includes interference, the interference determining unit 103 may determine whether the interference signal is intra-cell interference or inter-cell interference based on whether the interference value satisfies an interference threshold of the predetermined mobile terminal receiving the desired signal in a transmission interval during which the serving base station transmitting the desired signal transmits a signal to other mobile terminals in the cell served by the serving base station. If the interference value is less than the interference threshold of the predetermined mobile terminal in the transmission interval, the interference signal is determined to be intra-cell interference. If the interference value is greater than or equal to the interference threshold of the predetermined mobile terminal in the transmission interval, the interference signal is determined to be inter-cell interference.

More specifically, after the interference signal is determined by the interference determining unit 103 to be intra-cell interference or inter-cell interference, the interference determining unit 103 may determine the source of the interference signal based on a beam arrival angle of another mobile terminal in the cell per se or a neighboring cell, the interference threshold of the predetermined mobile terminal, the position of the predetermined mobile terminal and the position of another mobile terminal in the cell.

According to an embodiment of the present disclosure, in a case that the interference determining unit 103 determines the interference signal to be intra-cell interference, the interference determining unit 103 may judge which beam transmitted from the serving base station to another mobile terminal causes interference to the desired signal based on the beam arrival angle of other mobile terminals in the cell per se, according to the following Equation (1), so as to determine the source of the interference signal, including determining information of the transmission power and the received power of the interference signal.

$$INR = \frac{P_i G_i L_i^{-\alpha}}{N_0} \leq INR_{th} \quad (1)$$

where, $N_0$ refers to the power of a noise, Pi to the power of an i-th potential interference signal transmitted from the serving base station, Li to a distance from the serving base station to the predetermined mobile terminal receiving the desired signal, Gi to a main beam gain of the i-th potential interference signal, $INR_{th}$ to the interference threshold of the predetermined mobile terminal, and a to a path loss index of a wireless link between the predetermined mobile terminal and the serving base station, where i is a positive integer.

Specifically, for each mobile terminal in the cell served by the base station, the interference determining unit 103 determines, based on the beam arrival angle of each mobile terminal, the signal that is transmitted from the serving base station to which mobile terminal (i.e., which beam transmitted from the base station) may cause interference to the desired signal, and further determines, for each potential interference signal that may cause interference to the desired signal, whether the potential interference signal is the interference signal according to the above Equation (1). If the interference caused by the potential interference signal to the predetermined mobile terminal exceeds the interference threshold, the interference determining unit 103 determines that the potential interference signal is the interference signal to the desired signal; otherwise, the interference determining unit 103 determines that the potential interference signal is not the interference signal to the desired signal.

Figure 5:
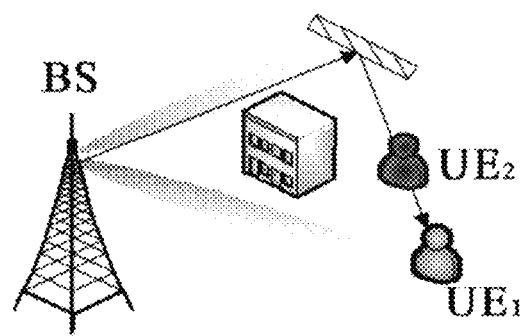
FIG. 5 illustrates an example of a wireless scene with intra-cell interference.

FIG. 5 illustrates an example of a wireless scene with intra-cell interference. As shown in FIG. 5, $UE_1$ is the predetermined mobile terminal to which the serving base station BS transmits the desired signal. As shown in FIG. 5, since $UE_1$ falls into the range of the beam arrival angle of another mobile terminal $UE_2$ in the cell in which $UE_1$ is located, the interference determining unit 103 can further determines, according to the above Equation (1), whether the interference caused to the desired signal by the signal transmitted from the serving base station to the mobile terminal $UE_2$ exceeds the interference threshold of $UE_1$, so as to determine whether the signal transmitted from the serving base station to the mobile terminal $UE_2$ causes interference to the desired signal. If the interference caused to the desired signal by the signal transmitted from the serving base station to the mobile terminal $UE_2$ exceeds the interference threshold of $UE_1$, the signal transmitted from the serving base station to the mobile terminal $UE_2$ is determined as the interference signal.

After the interference determining unit 103 determines the source of the interference signal and thereby determining the interference signal, the feature extraction unit 102 may extract a feature of the interference signal, for example, the path loss of the interference signal and the variance of the path loss. Thereby, the classification unit 101 may determine the wireless channel condition of the interference signal based on the feature extracted from the interference signal.

In a case that the interference determining unit 103 determines that the interference signal comes from inter-cell interference, the interference determining unit 103 may judge which neighboring base station and which beam transmitted from the neighboring base station to another mobile terminal cause interference to the desired signal based on the beam arrival angles of other mobile terminals in a neighboring cell, the interference threshold of the predetermined mobile terminal receiving the desired signal, the position of the predetermined mobile terminal and positions of other mobile terminals in the neighboring cell, according to, for example, the above Equation (1), so as to determine the source of the interference signal, including determining information such as the transmission power and the received power of the interference signal.

Specifically, for each mobile terminal in the cell served by the neighboring base station, the interference determining unit 103 determines, based on the beam arrival angles of respective mobile terminals, the signal transmitted by which base station to which mobile terminal served by the base station may cause interference to the desired signal, and further determines, for each potential interference signal that may cause interference to the desired signal, whether the potential interference signal is the interference signal according to the above Equation (1). Similarly, if the interference caused by the potential interference signal to the predetermined mobile terminal exceeds the interference threshold, the potential interference signal is determined as the interference signal to the desired signal; otherwise, the potential interference signal is determined as not the interference signal to the desired signal.

Figure 6:
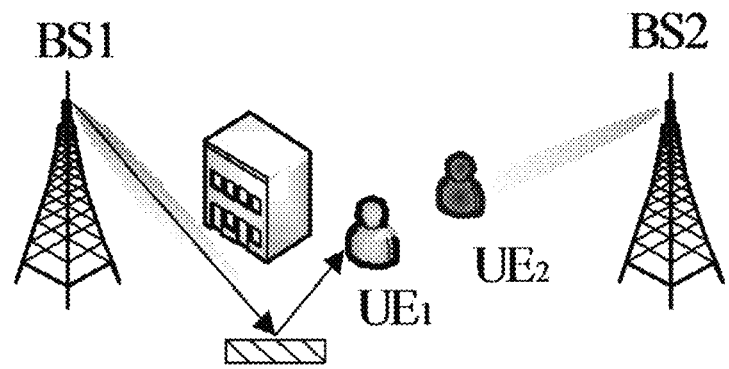
FIG. 6 illustrates an example of a wireless scene with inter-cell interference.

FIG. 6 illustrates an example of a wireless scene with inter-cell interference. As show in FIG. 6, $UE_1$ is the predetermined mobile terminal to which the serving base station $BS_1$ transmits the desired signal, $BS_2$ is the neighboring base station, and $UE_2$ is a mobile terminal in the cell served by the neighboring base station $BS_2$. As shown in FIG. 6, since $UE_1$ falls into the range of the beam arrival angle of the mobile terminal $UE_2$, the interference determining unit 103 may further determine based on the above Equation (1) whether the interference caused to the desired signal by the signal transmitted to the mobile terminal $UE_2$ from the neighboring base station $BS_2$ exceeds the interference threshold of $UE_1$, so as to determine whether the signal transmitted to the mobile terminal $UE_2$ from the neighboring base station $BS_2$ causes interference to the desired signal. If the interference caused to the desired signal by the signal transmitted to the mobile terminal $UE_2$ from the neighboring base station $BS_2$ exceeds the interference threshold of $UE_1$, the signal transmitted from the neighboring base station $BS_2$ to the mobile terminal $UE_2$ is determined as the interference signal.

Although FIG. 6 shows merely a wireless communication system including two neighboring base stations, the present disclosure is not limited thereto. For example, the wireless communication system may also include three or more neighboring base stations.

Similarly, after the interference determining unit 103 determines the source of the interference signal with the interference type being inter-cell interference and thereby determining the interference signal, the feature extraction unit 102 may extract a feature of the interference signal, for example, the path loss of the interference signal and the variance of the path loss. Thereby, the classification unit 101 may determine the wireless channel condition of the interference signal based on the feature extracted from the interference signal.

Although it is described above that the wireless channel condition of the interference signal is determined after the interference type of the interference signal is determined, the present disclosure is not limited thereto. For example, in a case that the interference type of the interference signal is known (e.g., in a case of only one cell as known, the interference signal must come from intra-cell interference), the source of the interference signal is directly determined, so as to determine the wireless channel condition of the interference signal.

After the feature of the desired signal and/or the interference signal for determining the wireless channel condition (including, but not limited to, the path loss and the variance of the path loss) is extracted, the classification unit 101 may classify wireless channel conditions of the desired signal and/or the interference signal based on the extracted feature.

Figure 7:
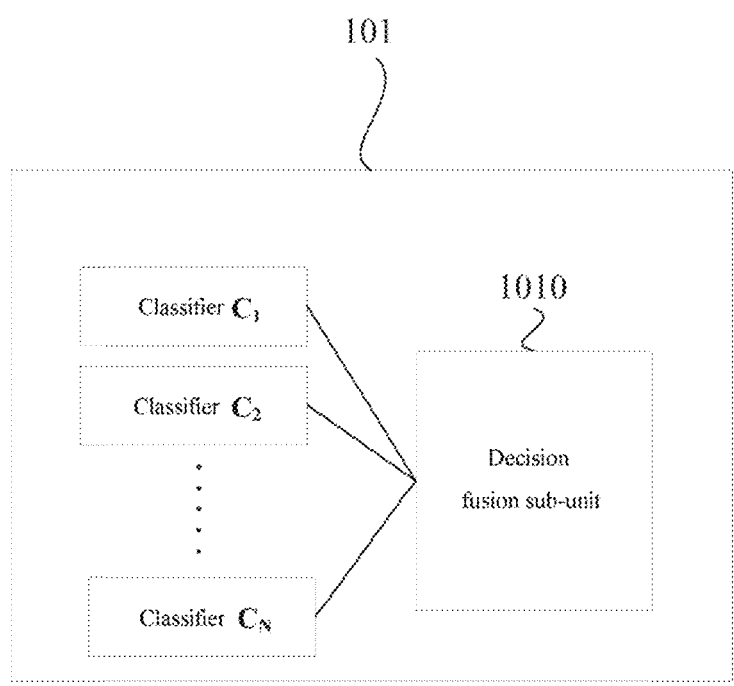
FIG. 7 is a block diagram illustrating an exemplary structure of a classification unit 101 according to an embodiment of the present disclosure.

Hereinafter, the structure of the classification unit 101 according to an embodiment of the present disclosure is described in detail. FIG. 7 is a block diagram illustrating an exemplary structure of a classification unit 101 according to an embodiment of the present disclosure.

As shown in FIG. 7, the classification unit 101 includes N trained classifiers $C_1$ to $C_N$, and a decision fusion sub-unit 1010. Each classifier corresponds to one of the combinations obtained by combining every two of the M wireless channel conditions, and is configured to classify the wireless channel condition of the wireless signal as one wireless channel condition in the one combination. The decision fusion sub-unit 1010 is configured to perform decision fusion on classification results of the N classifiers $C_1$ to $C_N$.

The decision fusion according to the present disclosure means that results of multiple classifiers are combined (e.g., weighted and combined) to acquire the final classification result, which is a common term in the field of machine learning, and is well known to those skilled in the art.

According to the present disclosure. $N=C_M^2$ classifiers are formed by combining every two of multiple binary classification modes available in the prior art. Each of the classifiers may be a binary classifier that is well known in the prior art.

According to a preferred embodiment of the present disclosure, each of the N classifiers $C_1$ to $C_N$ included in the classification unit 101 may be an AdaBoost algorithm classifier based on a back propagation neural network. However, the present disclosure is not limited thereto. Each of the N classifiers may also be a binary classifier of other types, such as an SVM classifier (e.g., LSSVM), a Bayesian classifier, a linear classifier and a binary classifier based on deep learning.

For example, in a case that M predetermined wireless channel conditions are line of sight (LOS), non line of sight (NLOS) and obstructed line of sight (OLOS), every two of the three wireless channel conditions LOS, NLOS and OLOS may be combined to form $N=C_M^2=3$ combinations that correspond to three classifiers. Moreover, the three classifiers respectively correspond to the combination of LOS and NLOS, the combination of LOS and OLOS, and the combination of OLOS and NLOS.

According to the present disclosure, training data is inputted to each of the N classifiers to generate a classifier model, that is, to train each of the classifiers. The input training data may be feature parameters of the desired signal and the interference signal corresponding to each of the M predetermined wireless channel conditions, such as at least one of the path loss and the variance of the path losses of the desired signal or the interference signal, or root mean square delay spread of the desired signal or the interference signal and/or kurtosis and asymmetry of a probability distribution function of a received signal.

Figure 8:
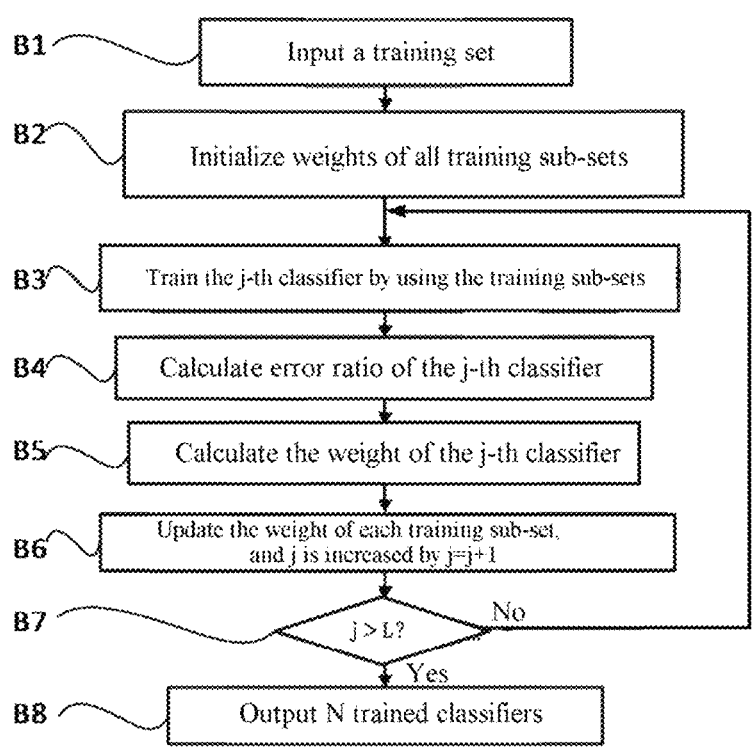
FIG. 8 is a flowchart illustrating in detail training process of each of the N classifiers.

Hereinafter, the AdaBoost classifier (of which the classification output are two classes (1 and −1)) is taken as an example of each of the N classifiers according to the present disclosure, a process for training each of the N classifiers is described in detail in conjunction with a flowchart of FIG. 8. It is to be noted that, in the present disclosure, the feature for training the classifier, and the feature extracted when the classifier is used for classifying the wireless channel condition of the wireless signal belong to the same type.

In step B1, a training data set $\{(x_i, y_i)\}_{i=1}^{K}$, $y_i=-1/1$ including K training sub-sets is inputted, where $x_i$ denotes the feature parameter inputted into the classifier, $y_i$ denotes the output of the classifier, that is, a classification result of the wireless channel condition of the wireless signal with a feature parameter $x_i$.

Then, in step B2, a weight of each training data sub-set is initialized.

Next, in step B3, each training data sub-set $(x_i, y_i)$ is used for training the j-th AdaBoost classifier, and the training output of the j-th AdaBoost classifier is obtained, where the initial value of j is 1.

Then, in step B4, training error rates of the j-th AdaBoost classifier of all training data sub-sets are traversed.

Next, in step B5, the weight of the j-th AdaBoost classifier is calculated based on the training error rates.

Then, in step B6, the weight of each training data sub-set is updated based on the weight of the j-th AdaBoost classifier, and j is increased by 1.

Above steps B3-B6 are iteratively performed until the steps B3-B6 are performed for each of the N AdaBoost classifiers, that is, until j is judged to be greater than L in B7.

Then, in step B8, the N trained classifiers are acquired.

Generally, a neural network is mainly formed by three parts, including an input layer, a hidden layer and an output layer. In the back propagation neural network, weights are corrected based on a total error between the actual output and the target output which is propagated from the output layer to the first hidden layer (the hidden layer closest to the output layer). The training process using an AdaBoost classifier algorithm that is based on directional propagation consists of forward propagation and back propagation. In the process of forward propagation, the inputted information is processed layer by layer from the input layer to the hidden layer, and then is propagated to the output layer. The state of neurons of each layer affects the state of neurons of only a next layer. If no desired output is acquired from the output layer, back propagation is used, in which an error signal is returned along the original connecting path, and weights of neurons of each layer are modified to minimize the error signal.

During test, that is, in identifying the predetermined wireless scene, the classification unit 101 is configured to determine the classification of the wireless channel condition of the wireless signal in the predetermined wireless scene based on the classification result of each of N classifiers and a weight of each of the M wireless channel conditions.

Specifically, the wireless channel condition of the desired signal and/or the interference signal in the predetermined wireless scene is classified based on the feature extracted by the feature extraction unit from the environmental parameter of the predetermined wireless scene through each of the N classifiers, so as to acquire N classification results for each of the desired signal and the interference signal respectively. Each classifier classifies the wireless signal (including the desired signal and the interference signal) as one of M predetermined wireless channel conditions. As a result, each classifier corresponds to one classification result.

Then, the decision fusion sub-unit 1010 performs decision fusion on classification results of each of the N classifiers based on a weight of each wireless channel condition. According to the present disclosure, the weight of each wireless channel condition can be determined based on a correct identification ratio of the wireless channel condition which is outputted when the N classifiers are trained.

Particularly, the decision fusion sub-unit 1010 counts the number of classification results of the N classifiers which are classified as each of the M wireless channel conditions, that is the number of votes for the wireless channel condition from each classifier (in a case that the classifier classifies a wireless channel condition as the one of the wireless channel conditions, it may be deemed that the classifier casts a vote for the wireless channel condition, and does not cast a vote for another wireless channel condition corresponding to the classifier). For example, in the above example where the M wireless channel conditions are the three predetermined wireless channel conditions LOS, NLOS and OLOS, when a classification result of a classifier corresponding to the combination of LOS and NLOS is the wireless channel condition LOS, a classification result of a classifier corresponding to the combination of NLOS and OLOS is the wireless channel condition OLOS, and a classification result of a classifier corresponding to the combination of LOS and OLOS is the wireless channel condition OLOS, the decision fusion sub-unit 1010 may count the number of wireless channel conditions LOS (i.e., the number of votes) as 1, the number of wireless channel conditions NLOS (i.e., the number of votes) as 0, and the number of wireless channel conditions OLOS (i.e., the number of votes) as 2.

According to the present disclosure, the decision fusion unit 1010 may directly determine a wireless channel condition for the wireless signal based on the number of votes for the wireless channel condition. For example, in the above example, the wireless channel condition with the largest number of votes (i.e., the wireless channel condition OLOS) may be determined as the wireless channel condition for the wireless signal.

In order to improve the accuracy of wireless scene identification, according to a preferred embodiment of the present disclosure, the decision fusion unit 1010 may further weight each of the wireless channel conditions. For example, the correct identification ratio for each of the wireless channel conditions acquired during training serves as a weight to weight the wireless channel condition, and a wireless channel condition corresponding to the maximum weighted value is determined as the wireless channel condition for the wireless signal. For example, in the above example, if the correct identification ratios of each wireless channel scenes acquired during training respectively correspond to W1, W2 or W3 (e.g., 0.8, 0.9 and 0.6 respectively), scores acquired for each wireless channel conditions LOS, NLOS and OLOS are W1, 0 and 2×W3 respectively, so that the decision fusion unit may determine the wireless channel condition corresponding to the maximum weighted value (e.g., the wireless channel condition OLOS) as the wireless channel condition for the wireless signal.

According to a preferred embodiment of the present disclosure, the wireless channel condition of the desired signal may be classified as one of line of sight, non line of sight and obstructed line of sight for the desired signal, while the wireless channel condition of the interference signal may be classified, based on the wireless channel condition and the interference type of the interference signal, as one of intra-cell line of sight, intra-cell non line of sight, intra-cell obstructed line of sight, inter-cell line of sight, inter-cell non line of sight and inter-cell obstructed line of sight. Therefore, based on wireless channel conditions of the desired signal and the interference signal as well as the interference type, a list including multiple wireless scenes can be acquired, as shown in FIG. 9.

As shown in FIG. 9, in a case that the desired signal does not include an interference signal, the predetermined wireless scene may be classified as one of classes 19-21 of the wireless scene shown in FIG. 9 based on the wireless channel condition of the desired signal. In a case that the desired signal includes an interference signal, the predetermined wireless scene may be classified as one of classes 1-18 of the wireless scene based on the wireless channel condition of the desired signal, the wireless channel condition of the interference signal, and the type of the interference signal.

FIG. 9 shows that the wireless scene is classified based on the wireless channel condition of the desired signal, the wireless channel condition of the interference signal, and the type of the interference signal. However, the present disclosure is not limited thereto. For example, the wireless scene may also be classified only based on the wireless channel condition of the interference signal (e.g., in a case that only the interference signal is the focus of consideration in the wireless scene), so that the predetermined wireless scene is classified as one of line of sight, non line of sight and obstructed line of sight for the interference signal. Alternatively, the predetermined wireless scene may be classified only based on both the wireless channel condition and the interference type of the interference signal, so that the predetermined wireless scene can be classified as one of intra-cell line of sight, intra-cell non line of sight, intra-cell obstructed line of sight, inter-cell line of sight, inter-cell non line of sight, and inter-cell obstructed line of sight.

The processing circuit 10 may acquire the wireless scene category of the predetermined wireless scene based on the classification result of the classification unit by inquiring the scene list shown in FIG. 9. After the category of the predetermined wireless scene is identified by the wireless scene identification apparatus, different channel models and wireless spectrum resource allocation strategies may be used based on different identified wireless scenes.

The wireless scene identification apparatus according to the present disclosure can be used to identify the wireless scene of a wireless communication system based on ultra-dense networking in a millimeter wave band. Due to a short wave length and a wide bandwidth, the millimeter wave is able to effectively solve many challenges confronted with by high speed broadband wireless access. Therefore, the millimeter wave has a prospect of being broadly applied in short-distance communication. Accordingly, the wireless scene identification apparatus according to the present disclosure also has a promising application prospect.

The wireless scene identification apparatus according to the present disclosure may be set independent of a wireless communication device (e.g., a base station, a mobile terminal, or a spectrum coordinator) in a wireless communication scene, or may be integrated with the above wireless communication device.

Figure 10:
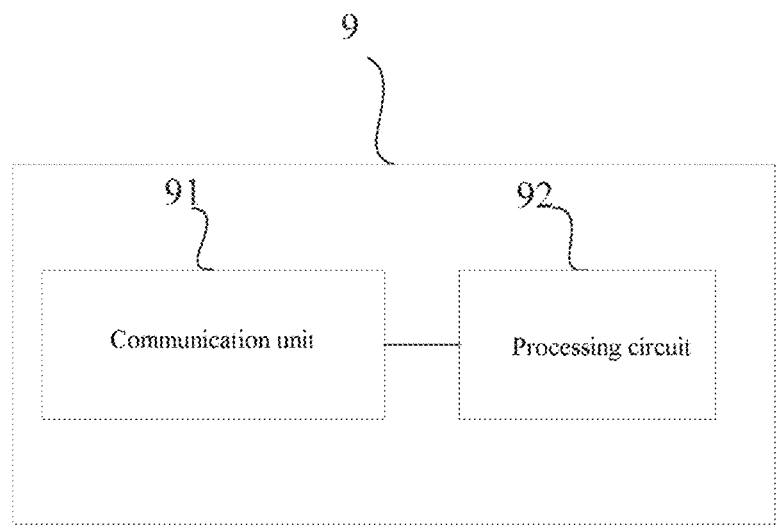
FIG. 10 is a block diagram illustrating an exemplary structure of a wireless communication device according to the present disclosure.

According to the present disclosure, a wireless communication device in a wireless communication system is provided. FIG. 10 is a block diagram illustrating the structure of the wireless communication device according to the present disclosure.

As shown in FIG. 10, the wireless communication device 9 includes a communication unit 91 configured to acquire environmental parameter information from the predetermined wireless scene; and a processing circuit 92 configured to classify, through multiple trained classifiers, a wireless channel condition of a wireless signal in the predetermined wireless scene based on features extracted from the environmental parameter information, perform decision fusion on classification results of the multiple classifiers, to classify the wireless channel condition as one of multiple predetermined wireless channel conditions, and identify the scene category of the predetermined wireless scene based on the wireless channel condition.

According to the present disclosure, the multiple classifiers include N classifiers, and the multiple predetermined wireless channel conditions include M predetermined wireless channel conditions, where M is an integer greater than or equal to 2, and N is the number of combinations obtained by combining every two of the M wireless channel conditions, and each classifier corresponds to one of the combinations, and is configured to classify the wireless channel condition as one wireless channel condition in the one combination.

According to the present disclosure, the multiple predetermined wireless channel conditions may include line of sight, non line of sight, and obstructed line of sight, where the obstructed line of sight indicates the wireless channel condition in which a propagated signal is blocked by a penetrable object.

The wireless communication device according to the present disclosure may be, for example, a base station, a mobile terminal or a spectrum coordinator.

Since classification processing, feature extraction processing and wireless scene identification processing for the wireless channel condition of the wireless signal performed by the processing circuit 92 of the wireless communication device 9 may be, for example, the same as or similar to classification processing performed by the classification unit, feature extraction processing performed by the feature extraction unit, and wireless scene identification processing of the wireless scene identification unit in the wireless scene identification apparatus which are described with reference to FIGS. 1 to 9, detailed description thereof is omitted here.

Figure 11:
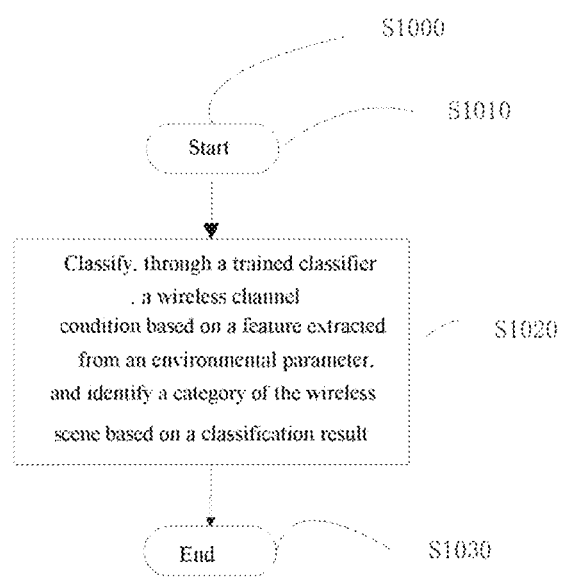
FIG. 11 is a flowchart illustrating a wireless scene identification method for identifying a predetermined wireless scene according to an embodiment of the present disclosure.

FIG. 11 is a flowchart illustrating a wireless scene identification method for identifying a predetermined wireless scene according to an embodiment of the present disclosure.

As shown in FIG. 11, the processing flow S1000 of the wireless scene identification method according to an embodiment of the present disclosure starts with S1010, and then the processing of step S1020 is executed.

In step S1020, a wireless channel condition of a wireless signal in the predetermined wireless scene is classified through multiple trained classifiers based on a feature extracted from an environmental parameter of the predetermined wireless scene, decision fusion is performed on classification results of the multiple classifiers, to classify the wireless channel condition as one of multiple predetermined wireless channel conditions, so that the scene category of the predetermined wireless scene is identified based on a classification of the wireless channel condition. According to the present disclosure, the multiple classifiers include N classifiers, and the multiple predetermined wireless channel conditions include M predetermined wireless channel conditions, where M is an integer greater than or equal to 2, N is the number of combinations obtained by combining every two of the M wireless channel conditions. Each of the N classifiers corresponds to one of the combinations, and is configured to classify the wireless channel conditions as one wireless channel condition in the one combination. For example, step S1020 may be implemented by executing, for example the processing performed by the classification unit 101 as described with reference to FIG. 2, and the description thereof is omitted here. Then, step S1030 is executed.

The processing flow S1000 ends at S1030.

The environmental parameters according to the present disclosure may include environmental parameters collected from at least one of a mobile terminal, a spectrum coordinator and a base station in the predetermined wireless scene.

According to the wireless scene identification method according to the present disclosure, at step S1020, wireless channel conditions of a desired signal, an interference signal, or wireless channel conditions of both the desired signal and the interference signal in the predetermined wireless scene are classified through the N trained classifiers based on features extracted from an environmental parameter of the predetermined wireless scene, so that the scene category of the predetermined wireless scene is identified based on the classification of the wireless channel condition of the desired signal and/or the interference signal.

At Step S1020, in a case that the wireless channel conditions of the desired signal and the interference signal in the predetermined wireless scene are classified by the N trained classifiers, an interference type of the interference signal may be further determined based on information interaction between wireless communication devices in the predetermined wireless scene, and the scene category of the predetermined wireless scene is identified based on the interference type of the interference signal. According to the present disclosure, the interference type includes no interference, intra-cell interference from a cell per se and intercell interference from a neighboring cell. The processing for determining the interference type of the interference signal may, for example, be implemented with reference to the processing of the interference determining unit of the wireless scene identification apparatus described in conjunction with FIGS. 1-9, the description thereof is omitted here.

In the wireless scene identification method according to the present disclosure, the environmental parameter may be received from, for example, at least one of the mobile terminal, the spectrum coordinator and the base station in the predetermined wireless scene. Moreover, the features extracted from the environmental parameter may include features for determining the interference type of the interference signal and features for judging the classification of the wireless channel condition of the desired signal or the interference signal. The processing of receiving the environmental parameter and the processing of extracting the features may, for example, be implemented with reference to the processing of the communication unit and the feature extraction unit of the wireless scene identification apparatus described in conjunction with FIGS. 1-9, the description thereof is omitted here.

According to an embodiment of the present disclosure, the features for determining the interference type of the interference signal include at least one of position information of the mobile terminal and the arrival angle of the beam transmitted by the base station, and the features for judging the classification of the wireless channel condition of the desired signal or the interference signal include at least one of path loss of the desired signal or the interference signal and a variance of the path loss. According to a preferred embodiment of the present disclosure, the features for judging the classification of the wireless channel condition of the desired signal or the interference signal further include: root mean square delay spread of the desired signal or the interference signal, and/or kurtosis and asymmetry of a probability distribution function of a received signal.

According to the present disclosure, in step S1020, in a case that the interference type of the interference signal is determined as the intra-cell interference or the inter-cell interference, the source of the interference signal may be determined based on position information of a mobile terminal served by the desired signal, position information of other mobile terminals and an arrival angle of the beam, and the wireless channel condition of the interference signal is determined based on the source of the interference signal. The processing for determining the source of the interference signal may, for example, be implemented with reference to the processing of the interference determining unit of the wireless scene identification apparatus described in conjunction with FIGS. 1-9, the description thereof is omitted here.

Each of the N classifiers according to the present disclosure is an AdaBoost classifier based on a back propagation neural network.

According to an embodiment of the present disclosure, in step S1020, the classification of the wireless channel condition of the wireless signal in the predetermined wireless scene is determined based on the classification result of each of the N classifiers and a weight of each of the M wireless channel conditions. According to a preferred embodiment of the present disclosure, the weight of each wireless channel condition is determined based on a correct identification ratio of each wireless channel condition which is outputted when the N classifiers are trained. The processing for determining the classification of the wireless channel condition of the wireless signal may, for example, be implemented with reference to the processing of the classification unit of the wireless scene identification apparatus described in conjunction with FIGS. 1-9, the description thereof is omitted here.

Figure 12:
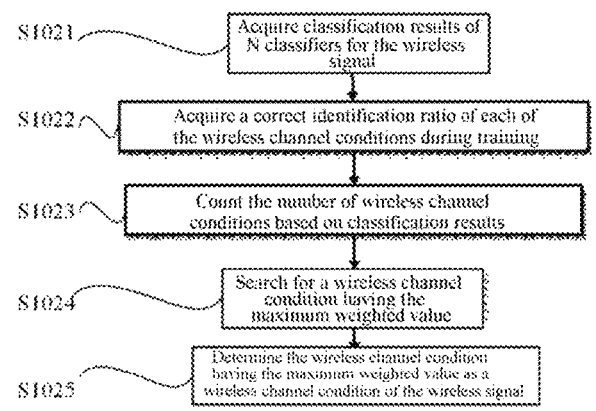
FIG. 12 is a flowchart illustrating a process of determining the classification of the wireless channel condition of the wireless signal according to classification results of N classifiers and a weight of the wireless channel condition.

FIG. 12 is a flowchart illustrating a process of determining the classification of the wireless channel condition of the wireless signal based on classification results of N classifiers and the weight of the wireless channel condition acquired when the classifiers are trained.

Reference is made to FIG. 12, in step S1021, a classification result for the wireless channel condition of the wireless signal in the predetermined wireless scene is acquired from each of the N classifiers. Then, in step S1022, the correct identification ratio of each of the M predetermined wireless scenes acquired when the classifiers are trained is acquired. Next, in step S1023, the number of classification results of the N classifiers which are classified as each wireless scene category is counted. Then, in step S1024, the counted number for each wireless scene category in the classification result is weighted, and the wireless scene category having the maximum weighted value is determined. Next, in step S1025, the category of the wireless scene having the maximum weighted value is determined as the wireless scene category of the predetermined wireless scene.

According to a preferred embodiment of the present disclosure, the M wireless channel conditions include line of sight, non line of sight, and obstructed line of sight, where the obstructed line of sight refers to the wireless channel condition in which a propagated signal is blocked by a penetrable object.

The wireless scene identification method according to the present disclosure may be used for identifying a wireless scene of a wireless communication system based on ultra-dense networking in a millimeter wave band.

According to the present disclosure, a wireless communication system for identifying a predetermined wireless scene in which the wireless communication system is located is further provided. The wireless communication system includes a predetermined mobile terminal, a serving base station, a spectrum coordinator, and a neighboring base station. The predetermined mobile terminal is configured to receive a desired signal transmitted by the serving base station, and transmit information on a received power and a beam arrival angle for the desired signal to the serving base station. The serving base station is configured to determine an interference type of an interference signal to the desired signal based on the information received from the predetermined mobile terminal, obtain interference information of the interference signal based on the interference type of the interference signal, where a wireless channel condition of the interference signal is obtained as the interference information in a case that the interference type of the interference signal is intra-cell interference, and determine a scene category of the predetermined wireless scene based on the interference information of the interference signal and/or the wireless channel condition of the desired signal. The spectrum coordinator is used to determine a source of the interference signal, and transmit information for requesting the wireless channel condition of the interference signal to the neighboring base station generating the interference signal in a case that the interference type of the interference signal is determined by the serving base station as inter-cell interference. The neighboring base station is used to, in response to the request of the spectrum coordinator, determine the wireless channel condition of the interference signal by multiple trained classifiers classifying the wireless channel condition of the interference signal based on features extracted from environmental parameters of the predetermined wireless scene, and transmit the wireless channel condition of the interference signal to the spectrum coordinator as the interference information, thereby transmitting to the serving base station through the spectrum coordinator. The serving base station determines the wireless channel condition of the desired signal by: classifying, through multiple trained classifiers, the wireless channel condition of the desired signal in the predetermined wireless scene based on features extracted from environmental parameters of the predetermined wireless scene, and performing decision fusion on classification results of the multiple classifiers. The serving base station determines the wireless channel condition of the interference signal in a case of intra-cell interference and the neighboring base station determines the wireless channel condition of the interference signal in a case of inter-cell interference by: classifying, through multiple trained classifiers, the wireless channel condition of the interference signal based on features extracted from environmental parameters of the predetermined wireless scene, and performing decision fusion on classification results of the multiple classifiers.

Figure 13:
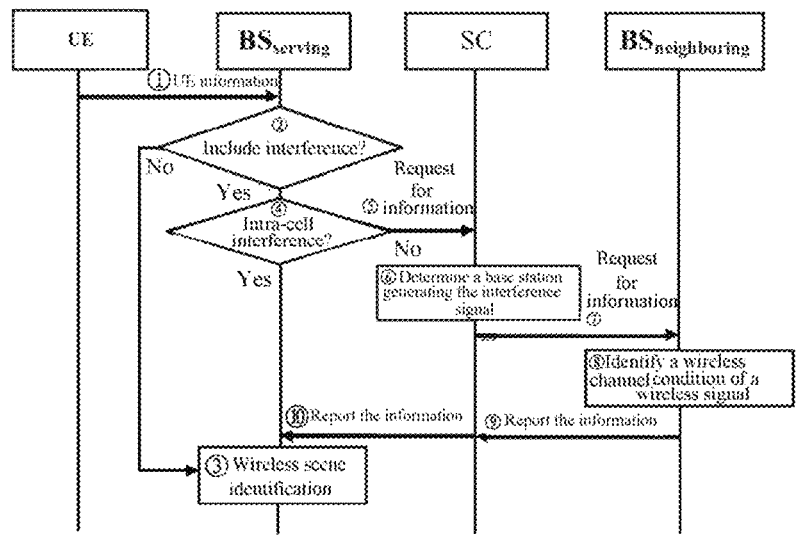
FIG. 13 is a signaling interaction diagram illustrating an example of a wireless scene identification method for identifying a wireless scene according to an embodiment of the present disclosure.

FIG. 13 is a signaling interaction diagram illustrating an example of identifying of a wireless scene by the above wireless communication system according to an embodiment of the present disclosure. The wireless communication system includes: a predetermined mobile terminal UE for receiving the desired signal, a serving base station $BS_{serving}$ for serving the predetermined mobile terminal, a spectrum coordinator $SC_{serving}$ and a neighboring base station $BS_{neighboring}$.

As shown in FIG. 13, the desired signal is transmitted to the predetermined mobile terminal UE by the serving base station $BS_{serving}$. The predetermined mobile terminal UE acquires its received power and the beam arrival angle for the desired signal, and transmits information on its position information, the received power and the beam arrival angle to the serving base station $BS_{serving}$ in step ①.

Then, in step ②, the wireless scene identification apparatus arranged in the serving base station $BS_{serving}$ determines whether an interference signal is included based on the interference threshold of the mobile terminal UE (e.g., $INR_{th}$).

In a case that an interference signal is not included (i.e., the INR value acquired by measurement is less than the interference threshold), the wireless scene identification apparatus arranged in the serving base station $BS_{serving}$ identifies the wireless channel condition of the desired signal based on the path loss of the desired signal collected in step ③ and the extracted variance of path loss, and identifies the wireless scene based on the wireless channel condition of the desired signal.

In a case that an interference signal is included (i.e., the INR value acquired by measurement is no less than the interference threshold), the serving base station $BS_{serving}$ determines whether the interference signal is from the base station in the cell per se (i.e., whether the interference is intra-cell interference or inter-cell interference) in step ④. For example, the interference signal may be determined to be intra-cell interference or inter-cell interference by determining whether the interference threshold of the mobile terminal served by the desired signal meets the requirement in a time interval during which the serving base station $BS_{serving}$ transmits the interference signal to other users served thereby. In a case of intra-cell interference, the serving base station $BS_{serving}$ identifies the wireless channel condition of the interference signal by determining the source of the interference signal, based on the collected path losses of the desired signal and the interference signal, and the extracted variances of the path losses of the desired signal and the interference signal, and identify the wireless scene based on the wireless channel conditions of the desired signal and the interference signal, and the interference type of the interference signal in step ③.

In a case that the included interference signal is inter-cell interference, the serving base station $BS_{serving}$ may transmit a request to the spectrum coordinator SC for transmitting information on an interference channel condition of the interference signal and the position of a mobile terminal requiring protection in step ⑤ (a user requiring protection refers to a neighboring mobile terminal requiring protection in the cell per se in an overlapping region of cells, and this mobile terminal may be subjected to harmful interference of the beam from the serving cell, and is usually a mobile terminal in a short distance from the predetermined mobile terminal).

In step ⑥, the spectrum coordinator SC may determine which signal transmitted by which base station causes interference to the desired signal based on the interference threshold $INR_{th}$ of the predetermined mobile terminal, the position information of the predetermined mobile terminal, and the beam arrival angle of another mobile terminal.

In step ⑦, the spectrum coordinator SC transmits a request to a neighboring base station generating the interference signal for transmitting the information on the interference channel condition of the interference signal.

In step ⑧, the neighboring base station $BS_{neighboring}$ identifies the wireless channel condition of the interference signal through N classifiers based on features such as the path loss and the variance of path loss of the interference signal. In steps ⑨ and ⑩, the interference channel condition of the interference signal is transmitted to the serving base station $BS_{serving}$ by the spectrum coordinator SC, so that the serving base station $BS_{serving}$ identifies the wireless scene based on the identification of the channel condition of the desired signal in combination with the interference channel condition and the interference type of the interference signal.

Although in the above signaling interaction diagram, a part of interference determining operation described performed by the interference determining unit in the wireless scene identification apparatus described in conjunction with FIGS. 1-9 is implemented by the spectrum coordinator and the neighboring base station, the present disclosure is not limited thereto. Those skilled in the art can understand that in a case that the interference signal comes from inter-cell interference, the operation of determining the interference base station generating the interference signal and identifying the interference channel condition of the interference signal may be also implemented by a serving base station provided with a wireless scene identification apparatus, provided that the serving base station can acquire information on the position and the beam arrival angle of the mobile terminal in the neighboring cell from the neighboring base station.

The inventors perform simulation experiment for the wireless scene identification method provided in the present disclosure. The simulation experiment is based on the AdaBoost algorithm based on back propagation neural network; and the identified wireless channel conditions are line of sight, non line of sight and obstructed line of sight. The simulation parameters are set as those shown in Table 1.

TABLE 1

| Simulation Parameter | |
|---|---|
| Simulation Parameters | Simulated Values |
| Number of Hidden Layers | 1 |
| Number of Nodes in the Hidden Layer | 6 |
| Number of Iterations by the Back Propagation Neural Network | 5 |
| Learning Rate of the Neural Network | 0.1 |
| Learning Target (error ratio of identification) | 0.00004 |

TABLE 1-continued

Simulation Parameter

| Simulation Parameters | Simulated Values |
|---|---|
| Number of Identified Scenes | 3 |
| Number of Iterations by AdaBoost | 10 |

As shown in Equation (2) below (see "*Millimeter-Wave Omnidirectional Path Loss Data for Small Cell 5G Channel Modeling*" published on IEEE Access (vol. 3, pp. 1573-1580, September 2015) by G R. Maccartney, T. S. Rappaport, M. K. Samimi, and S. Sun et al.), the simulation model is a channel model in the millimeter wave frequency band.

$$PL[dB](d) = 20 \times \log_{10}\left(\frac{4\pi d_0}{\lambda}\right) + 10\bar{n}\log_{10}\left(\frac{d}{d_0}\right) + X_\sigma \quad (2)$$

where $d_0 = 1$ meter; $d \geq d_0$; $X_\sigma \sim N(0, \sigma^2)$

In Equation (2), d denotes a distance between a transmitter and a receiver, σ denotes a shading coefficient, $\bar{n}$ denotes a path loss parameter, λ denotes the wave length of the signal transmitted by the base station, and $X_\sigma$ denotes shadow fading.

The channel model is used for extracting the required feature parameters such as path loss and a variance of path loss which serve as input training data and testing data.

Figure 14:
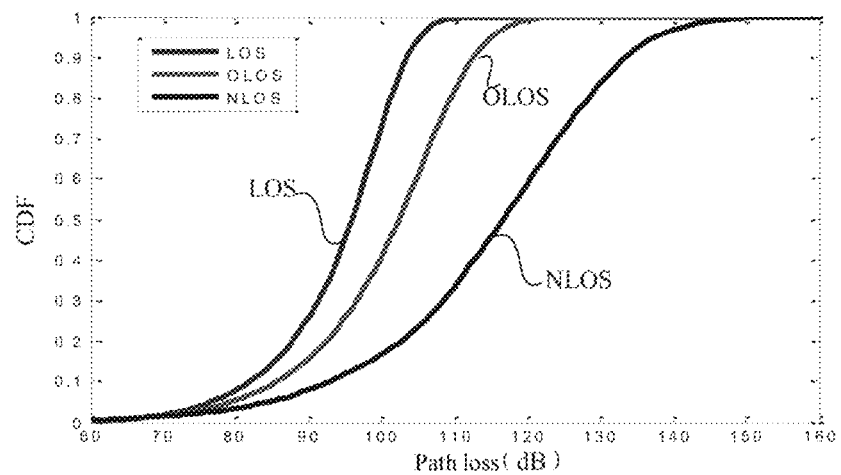
FIG. 14 illustrates path losses in different wireless channel conditions.

FIG. 14 shows the extracted path losses corresponding to non line of sight (NLOS), line of sight (LOS) and obstructed line of sight (OLOS), respectively, where vertical coordinate CDF represents a cumulative distribution function representing the probability of the path loss being smaller than the path loss represented by a horizontal coordinate.

Table 2 shows correct classification ratios of three channel conditions (LOS, NLOS and OLOS) acquired by using the wireless channel identification method according to the present disclosure; and Table 3 shows error rates of classification acquired by direct classification weighting without decision fusion according to the conventional technology. As can be seen from Tables 2 and 3, with the wireless channel identification method involving decision fusion according to the present disclosure, classification performance of the entire system can be improved. Classification performance generated based on two parameters shown in Table 2 is substantially increased compared with that generated based on one parameter, that is, increasing the number of extracted feature parameters is also a method for improving system performance.

TABLE 2

Correct Classification Ratios

| Scene Category | Correct Identification Ratios (Single Feature) | Correct Identification Ratios (Two Features) |
|---|---|---|
| LOS | 88.3% | 99.9% |
| NLOS | 60.9% | 100% |
| OLOS | 40.1% | 99.8% |

TABLE 3

Error Ratios of Classification without Decision Fusion

| Scene Category | Error Ratios of Classification (Single Feature) |
|---|---|
| LOS | 15.4% |
| NLOS | 65.8% |
| OLOS | 62% |

Comparing with the conventional technology, the wireless scene identification apparatus and method and the wireless communication device according to the embodiments of the present disclosure have at least one of the following beneficial effects. Accuracy of identifying a wireless scene can be improved by performing decision fusion on classification results of multiple classifiers. The accuracy of identifying a wireless scene can be further improved by classification processing based on multiple features. Further, the wireless scene identification apparatus and method according to the present disclosure can be applied to identify the wireless scene of the wireless communication system based on ultra-dense networking in a millimeter wave band. Therefore, the wireless scene identification apparatus and method according to the present disclosure has a prospect of being broadly applied.

APPLICATION EXAMPLES OF USER EQUIPMENT

First Application Example

Figure 15:
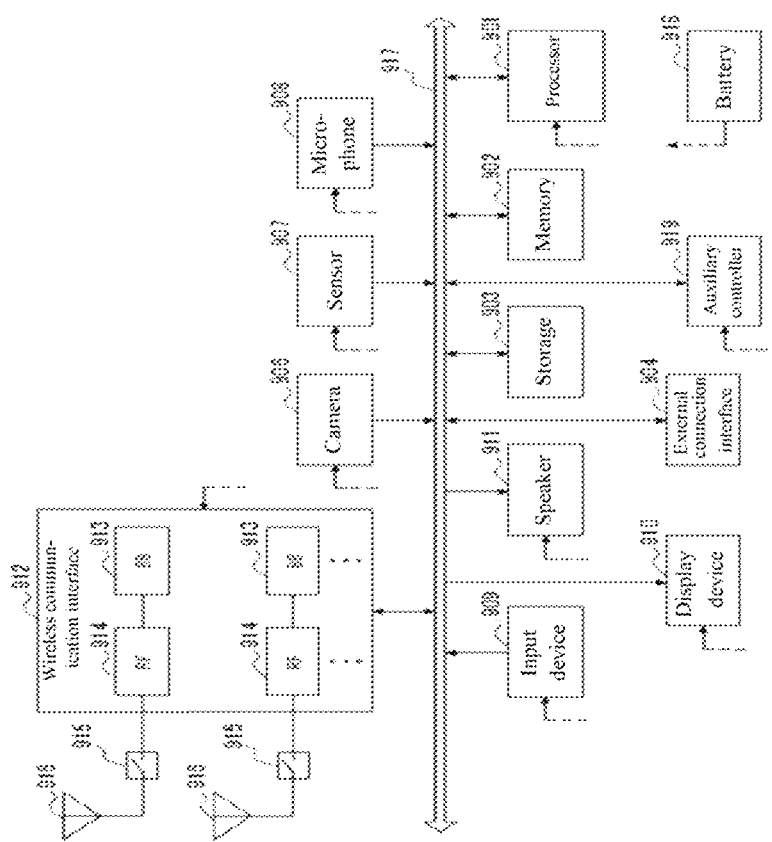
FIG. 15 a block diagram illustrating a schematic configuration example of a smartphone in which the technique of the disclosure can be applied.

FIG. 15 is a block diagram illustrating a schematic configuration example of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918 and an auxiliary controller 919.

The processor 901 may be, for example, a CPU or a system on a chip (SoC), and controls functions of an application layer and another layer of the smartphone 900. The memory 902 includes a RAM and a ROM, and stores data and programs executed by the processor 901. The storage 903 may include a storage medium, such as a semiconductor memory and a hard disc. The external connection interface 904 is an interface configured to connect an external apparatus (such as a memory card and a universal serial bus (USB) device) to the smart phone 900.

The camera 906 includes an image sensor (such as a Charge Coupled Device (CCD) and a Complementary Metal Oxide Semiconductor (CMOS)) and generates a captured image. The sensor 907 may include a set of sensors, such as a measurement sensor, a gyro sensor, a geomagnetism sensor, and an acceleration sensor. The microphone 908 converts sounds that are input to the smartphone 900 into audio signals. The input device 909 includes, for example, a touch sensor configured to detect touch on a screen of the display device 910, a keypad, a keyboard, a button, or a switch, and receives operations or information input from a user. The display device 910 includes a screen (such as a liquid crystal display (LCD) and an organic light-emitting diode (OLED) display), and displays an output image of the smartphone 900. The speaker 911 converts the audio signal that is output from the smartphone 900 into sound.

The wireless communication interface 912 supports any cellular communication scheme (such as LTE and LTE-Advanced), and performs wireless communication. The wireless communication interface 912 may generally include for example a BB processor 913 and an RF circuit 914. The BB processor 913 may perform for example coding/decoding, modulation/demodulation and multiplexing/de-multiplexing, and perform various types of signal processing for wireless communications. The RF circuit 914 may include a mixer, a filter and an amplifier for example, and transmits and receives a wireless signal via the antenna 916. The wireless communication interface 912 may be one chip module having the BB processor 913 and the RF circuit 914 integrated therein. The wireless communication interface 912 may include the multiple BB processors 913 and the multiple RF circuits 914, as illustrated in FIG. 15. Although FIG. 15 illustrates the example in which the wireless communication interface 912 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support another type of wireless communication scheme such as a short-distance wireless communication scheme, a near field communication scheme, and a wireless local area network (LAN) scheme. In that case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna), and is used for the wireless communication interface 912 to transmit and receive wireless signals. The smartphone 900 may include the multiple antennas 916, as shown in FIG. 15. Although FIG. 15 illustrates the example in which the smartphone 900 includes the multiple antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage device 903, the external connection interface 904, the camera 906, the sensor 907, the microphone 908, the input device 909, the display device 910, the speaker 911, the wireless communication interface 912, and the auxiliary controller 919 to each other. The battery 918 supplies power to each block of the smartphone 900 shown in FIG. 24 via feeders which are partially shown with dashed lines in the figure. The auxiliary controller 919, for example, operates a minimum necessary function of the smart phone 900, for example, in a sleep mode.

In the smartphone 900 shown in FIG. 15, the communication device 20 or the communication unit 91 described with reference to FIG. 1 or 9 may be implemented by the wireless communication interface 912. At least a part of the wireless scene identification functions according to the present disclosure may also be implemented by the processor 901 or the auxiliary controller 919.

Second Application Example

Figure 16:
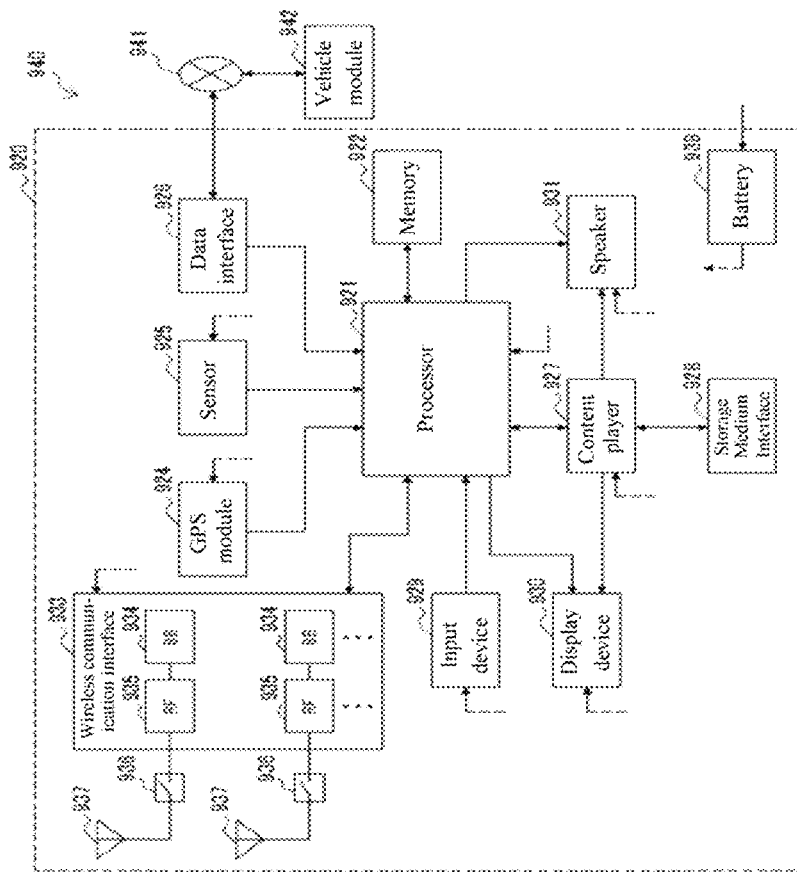
FIG. 16 is a block diagram illustrating a schematic configuration example of a car navigation device in which the technique of the disclosure can be applied.

FIG. 16 is a block diagram showing a schematic configuration example of a car navigation device 920 in which the technique of the disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937 and a battery 938.

The processor 921 may be for example a CPU or SoC, and controls the navigation function and additional functions of the car navigation device 920. The memory 922 includes RAM and ROM, and stores programs executed by the processor 921, and data.

The GPS module 924 measures a location of the car navigation device 920 (such as a latitude, a longitude and a height) using a GPS signal received from a GPS satellite. The sensor 925 may include a group of sensors such as a gyroscope sensor, a geomagnetic sensor and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch on a screen of the display device 930, a button, or a switch, and receives operations or information input from a user. The display device 930 includes a screen such as a LCD or an OLED display, and displays an image of the navigation function or content that is reproduced. The speaker 931 outputs the sound of the navigation function or the reproduced content.

The wireless communication interface 933 supports any cellular communication scheme (such as LTE and LTE-advanced) and performs wireless communication. The wireless communication interface 933 may usually include, for example, a BB processor 934 and an RF circuit 935. The BB processor 934 may perform for example coding/decoding, modulation/demodulation and multiplexing/de-multiplexing, and perform various types of signal processing for wireless communications. The RF circuit 935 may include, for example, a mixer, a filter and an amplifier, and transmits and receives wireless signals via the antenna 937. The wireless communication interface 933 may be a chip module on which the BB processor 934 and the RF circuit 935 are integrated. As shown in FIG. 16, the wireless communication interface 933 may include multiple BB processors 934 and multiple RF circuits 935. Although FIG. 16 shows an example in which the wireless communication interface 933 includes multiple BB processors 934 and multiple RF circuits 935, the wireless communication interface 933 may also include a single BB processor 934 or a single RF circuit 935.

Furthermore, in addition to a cellular communication scheme, the wireless communication interface 933 may support another type of wireless communication scheme, such as a short-distance wireless communication scheme, a near field communication scheme and a wireless LAN scheme. In this case, for each of the wireless communication schemes, the wireless communication interface 933 may include a BB processor 934 and an RF circuit 935.

Each of the antenna switches 936 switches connection destinations of the antennas 937 among multiple circuits (such as circuits for different wireless communication schemes) included in the wireless communication interface 933.

Each of the antennas 937 includes one or more antenna elements (such as multiple antenna elements included in a MIMO antenna) and is used by the wireless communication interface 933 to transmit and receive a wireless signal. As shown in FIG. 16, the car navigation device 920 may include multiple antennas 937. Although FIG. 16 illustrates the example in which the car navigation device 920 includes the multiple antennas 937, the car navigation device 920 may also include a single antenna 937.

Furthermore, the car navigation device 920 may include the antenna 937 for each wireless communication scheme. In this case, the antenna switch 936 may be omitted from the configuration of the car navigation device 920.

The battery 938 supplies power to each block of the car navigation device 920 shown in FIG. 16 via feeders which are partially shown with dashed lines in the drawing. The battery 938 accumulates power supplied from the vehicle.

In the car navigation device 920 shown in FIG. 16, the communication device 20 or the communication unit 91 described with reference to FIG. 1 or 9 may be implemented by the wireless communication interface 933. At least a part of the wireless scene identification functions according to the present disclosure may also be implemented by the processor 921.

The technology of the present disclosure may also be implemented as an in-vehicle system (or vehicle) 940 including a car navigation device 920, an in-vehicle network 941 and one or more blocks of a vehicle module 942. The vehicle module 942 generates vehicle data such as vehicle speed, engine speed, and fault information, and outputs the generated data to the in-vehicle network 941.

The basic principle of the present disclosure has been described above in conjunction with particular embodiments. However, to be further noted, it is to be appreciated for those ordinarily skilled in the art, all or any of the steps or components of the method and device according to the disclosure can be implemented in hardware, firmware, software or a combination thereof in any computing device (including a processor, a storage medium, etc) or a network of computing devices. It can be achieved by those ordinarily skilled in the art in light of the disclosure of the disclosure and making use of their general circuit designing knowledge or general programming skills.

Moreover, the present invention further provides a program product in which machine-readable instruction codes are stored. The instruction code, when read and executed by the machine, can perform the method according to the embodiment of the disclosure.

Accordingly, the storage medium for carrying the program product in which the machine readable instruction codes are stored is also included in the disclosure. The storage medium includes, but is not limited to, soft disk, optical disk, magnetic optical disk, memory card, memory stick and the like.

In a case that the present disclosure is implemented by software or firmware, a program constituting the software is installed in a computer with a dedicated hardware structure (e.g. the general computer 1800 shown in FIG. 17) from a storage medium or network, the computer installed with various programs is capable of implementing various functions mentioned above according the embodiments of the present disclosure.

Figure 17:
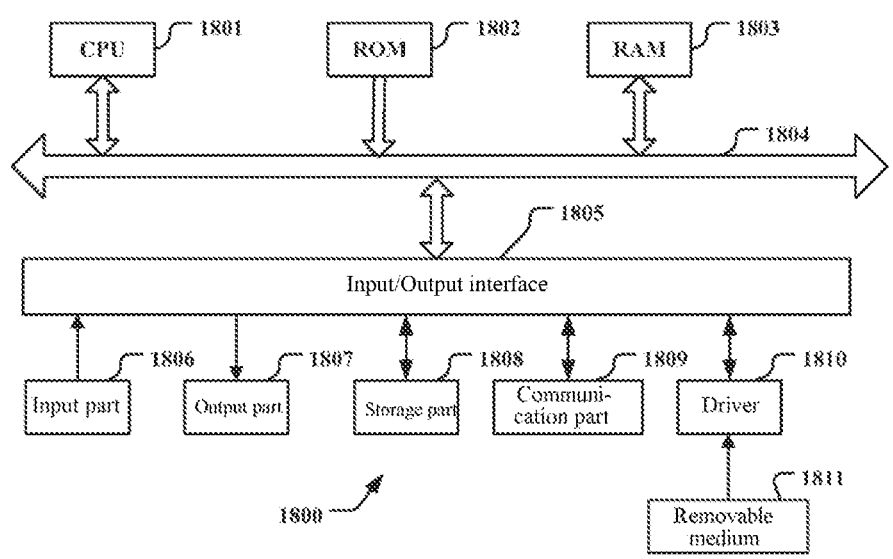
FIG. 17 is a block diagram illustrating an exemplary structure of a general purpose personal computer capable of realizing the method and/or apparatus and/or system according to an embodiment of the present disclosure.

In FIG. 17, a central processing unit (CPU) 1801 performs various processing according to the program stored in a read-only memory (ROM) 1802 or the program loaded from the storage part 1808 to a random access memory (RAM) 1803. In the RAM 1803, the data required by the CPU 1801 for performing the various processes is stored. The CPU 1801, the ROM 1802 and the RAM 1803 are linked with each other via a bus 1804. An input/output interface 1805 is also linked to the bus 1804.

The input/output interface 1805 is connected with an input part 1806 (including a keyboard, a mouse and the like), an output part 1807 (including a display, such as a Cathode Ray Tube (CRT) and a Liquid Crystal Display (LCD), and a loudspeaker), a storage part 1808 (including a hard disk and the like), and a communication part 1809 (including a network interface card, such as a LAN card, a modem and the like). The communication part 1809 performs communication processing via a network such as the Internet. A driver 1810 may also be connected with the input/output interface 1805 as needed. The removable medium 1811, such as magnetic disk, optical disk, magnetic optical disk and semiconductor memory and the like, may be mounted to the driver 1810 as required, so that the computer program read therefrom is mounted to the storage part 1808 as required.

In the case of implementation in software, the program consisting of the software is mounted from the network, such as the Internet, or from the storage medium, such as the removable medium 1811.

It is to be understood by those skilled in the art that, this storage medium is not limited to the removable medium 1811 as shown in FIG. 16 in which the program is stored and which is distributed separately from the device to provide the program for the user. The example of the removable medium 1811 includes magnetic disk (including soft disk (registered trademark)), optical disk (including compact disk read-only memory (CD-ROM) and Digital Video Disk (DVD)), magnetic optical disk (including mini disk (MD) (registered trademark)), and semiconductor memory. Alternatively, the storage medium may be the ROM 1802, the hard disk contained in the storage part 1808 or the like, which has a program stored therein and is distributed to the user along with an apparatus in which they are incorporated.

To be further noted, in the device, method and system according to the present disclosure, the respective components or steps can be decomposed and/or recombined. These decompositions and/or recombinations shall be regarded as equivalent solutions of the present disclosure. The steps for performing the above processes may be executed naturally in the description order in a chronological order, but is not necessarily to be executed in the chronological order. Some steps may be performed in parallel or independently from each other.

Finally, to be further noted, the term "include", "comprise" or any variant thereof is intended to encompass nonexclusive inclusion, so that a process, method, article or device including a series of elements includes not only those elements but also other elements which have not been listed definitely or an element(s) inherent to the process, method, article or device. Without limiting more, the elements defined by the statement "comprising a . . . " does not exclude the case that other similar elements may exist in the process, the method, the article or the device other than enumerated elements.

Although the embodiments of the disclosure have been described above in detail in connection with the drawings, it is appreciated that the embodiments as described above are merely illustrative but not limitative of the disclosure. Those skilled in the art can make various modifications and variations to the above embodiments without departing from the spirit and scope of the invention. Therefore, the scope of the disclosure is defined merely by the appended claims and their equivalents.

Each of constituent modules and/or units of the above-described apparatus may be configured by means of software, firmware, hardware, or a combination thereof. Specific means or manners available for configuration are well known to those skilled in the art, and no detailed description will be made herein. In a case of implementing by software or firmware, programs constituting the software are installed to a computer with a dedicated hardware structure from the storage medium or network. The computer installed with various programs can perform various types of functions.

If the foregoing series of processing is implemented by software, a program constituting the software is installed from the network such as the Internet or a storage medium such as the removable medium.

It should be understood by those skilled in the art that the storage medium is not limited to the removable medium in which the program is stored and which is distributed separately from the apparatus so as to provide the program to the user. The removable medium may be for example a magnetic disk (including a floppy disk (registered trademark)), an optical disk (including a Compact Disk Read-Only Memory (CD-ROM) and Digital Video Disk (DVD)), a magneto-optical disk (including minidisk (MD) (registered trademark)) and a semiconductor memory. Alternatively, the storage medium may be a ROM, a hard disk included in the storage part, etc., which has a program stored therein and is distributed to the user along with an apparatus in which they are incorporated.

A program product storing machine readable instruction codes is further provided in the present disclosure. The method according to the embodiments of the present disclosure can be performed when the instruction codes are read and executed by a machine.

Accordingly, a storage medium for carrying the program product storing the machine readable instruction codes is further provided according to the present disclosure. The storage medium includes but is not limited to a floppy disc, an optical disc, a magnetic optical disc, a memory card, and a memory stick or the like.

It should also be explained that a relation term such as "left" and "right", "first" and "second" in the present disclosure is only used to distinguish one entity or operation from another entity or operation, and does not necessarily require or imply that there is an actual relation or sequence between these entities or operations. Moreover, terms "comprising", "including", or any other variant thereof are intended to encompass a non-exclusive inclusion such that processes, methods, articles, or devices that include a series of elements include not only those elements but also those that are not explicitly listed or other elements that are inherent to such processes, methods, articles, or devices. Without limiting more, the elements defined by the statement "comprising a . . . " does not exclude the case that other similar elements may exist in the process, the method, the article or the device other than enumerated elements In the above, the present disclosure is disclosed with the descriptions of the embodiments thereof. However, it should be understood that, various modifications, improvements or equivalents thereof may be designed for the present disclosure by those skilled in the art within the spirit and scope of the appended claims. These modifications, improvements or equivalents should be considered to fall within the protection scope of the present disclosure.

The invention claimed is:

1. A wireless scene identification apparatus for identifying a scene category of a predetermined wireless scene, comprising:
   a processing circuit configured to:
      classify, by a plurality of trained classifiers, one or more of a wireless channel condition of a desired wireless signal and an interference signal in the predetermined wireless scene based on a feature extracted from an environmental parameter of the predetermined wireless scene;
      perform decision fusion on classification results of the plurality of trained classifiers, to classify the wireless channel condition of the desired wireless signal and the interference signal as one of a plurality of predetermined wireless channel conditions; and
      identify the scene category of the predetermined wireless scene based on classification of the wireless channel condition of the desired wireless signal and the interference signal,
      wherein the feature extracted from the environmental parameter comprises a feature for determining an interference type of the interference signal and a feature for judging a category of the wireless channel condition of the desired wireless signal or the interference signal.

2. The wireless scene identification apparatus according to claim 1, wherein
   the plurality of predetermined wireless channel conditions comprise M wireless channel conditions, and the plurality of trained classifiers comprises N classifiers, where M is an integer greater than or equal to 2, and N is a number of combinations obtained by combining every two of the M wireless channel conditions, and
   each of the N classifiers corresponds to one of the combinations, and is configured to classify the wireless channel condition of the desired wireless signal and the interference signal as one wireless channel condition in the one combination.

3. The wireless scene identification apparatus according to claim 1, wherein the environmental parameter comprises an environmental parameter collected from at least one of a mobile terminal, a spectrum coordinator and a base station in the predetermined wireless scene.

4. The wireless scene identification apparatus according to claim 1, wherein the processing circuit is configured to
   classify, by the plurality of trained classifiers, the wireless channel condition of the desired signal and the interference signal in the predetermined wireless scene, and
   determine an interference type of the interference signal based on information interaction between wireless communication devices in the predetermined wireless scene, and
   identify the scene category of the predetermined wireless scene based on the interference type of the interference signal.

5. The wireless scene identification apparatus according to claim 4, wherein the interference type comprises no interference, intra-cell interference from a cell per se and inter-cell interference from a neighboring cell.

6. The wireless scene identification apparatus according to claim 1, wherein the feature for determining the interference type of the interference signal comprises at least one of position information of a mobile terminal and an arrival angle of a beam transmitted by a base station, and the feature for judging the category of the wireless channel condition of the desired signal or the interference signal comprises at least one of path loss of the desired signal or the interference signal and a variance of the path loss.

7. The wireless scene identification apparatus according to claim 6, wherein the feature for judging the category of the wireless channel condition of the desired signal or the interference signal further comprises root mean square delay spread of the desired signal or the interference signal and/or kurtosis and asymmetry of a probability distribution function of a received signal.

8. The wireless scene identification apparatus according to claim 5, wherein the processing circuit is configured to, in a case that the interference type of the interference signal is determined as the intra-cell interference or the inter-cell interference, determine a source of the interference signal based on position information of a mobile terminal served by the desired signal, position information and a beam arrival angle of other mobile terminals, and determine the wireless channel condition of the interference signal based on the source of the interference signal.

9. The wireless scene identification apparatus according to claim 1, wherein each of the plurality of trained classifiers is an AdaBoost classifier based on a back propagation neural network.

10. The wireless scene identification apparatus according to claim 9, wherein the processing circuit is configured to determine the classification of the wireless channel condition of the desired wireless signal and the interference signal in the predetermined wireless scene based on the classification result of each of the plurality of trained classifiers and a weight of each of the plurality of wireless channel conditions.

11. The wireless scene identification apparatus according to claim 10, wherein the weight of each of the plurality of wireless channel conditions is determined based on a correct identification ratio of each of the wireless channel conditions which is outputted when the plurality of classifiers are trained.

12. The wireless scene identification apparatus according to claim 1, wherein the plurality of predetermined wireless channel conditions comprise line of sight, non line of sight and obstructed line of sight, wherein the obstructed line of sight is a wireless channel condition in which a propagated signal is blocked by a penetrable object.

13. The wireless scene identification apparatus according to claim 1, wherein the wireless scene identification apparatus is configured to identify a wireless scene of a wireless communication system based on ultra-dense networking in a millimeter wave band.

14. A wireless communication device for identifying a scene category of a predetermined wireless scene, comprising:

a communication device configured to acquire an environmental parameter from the predetermined wireless scene; and a processing circuit configured to:

classify, by a plurality of trained classifiers, one or more of a wireless channel condition of a desired wireless signal and an interference signal in the predetermined wireless scene based on a feature extracted from the environmental parameter, perform decision fusion on classification results of the plurality of trained classifiers, to classify the wireless channel condition of the desired wireless signal and the interference signal as one of a plurality of predetermined wireless channel conditions, and identify the scene category of the predetermined wireless scene based on classification of the wireless channel condition of the desired wireless signal and the interference signal, wherein the feature extracted from the environmental parameter comprises a feature for determining an interference type of the interference signal and a feature for judging a category of the wireless channel condition of the desired wireless signal or the interference signal.

15. The wireless communication device according to claim 14, wherein the plurality of predetermined wireless channel conditions comprise line of sight, non line of sight and obstructed line of sight, wherein the obstructed line of sight is a wireless channel condition in which a propagated signal is blocked by a penetrable object.

16. The wireless communication device according to claim 14, wherein the wireless communication device is a base station, a mobile terminal or a spectrum coordinator.

17. A method for identifying a scene category of a predetermined wireless scene, comprising:

classifying, by a plurality of trained classifiers, one or more of a wireless channel condition of a desired wireless signal and an interference signal in the predetermined wireless scene based on a feature extracted from an environmental parameter of the predetermined wireless scene;

performing decision fusion on classification results of the plurality of trained classifiers, to classify the wireless channel condition of the desired wireless signal and the interference signal as one of a plurality of predetermined wireless channel conditions; and identifying the scene category of the predetermined wireless scene based on classification of the wireless channel condition of the desired wireless signal and the interference signal, wherein the feature extracted from the environmental parameter comprises a feature for determining an interference type of the interference signal and a feature for judging a category of the wireless channel condition of the desired wireless signal or the interference signal.

* * * * *